(No Model.) 4 Sheets—Sheet 1.

O. W. NOBLE, Dec'd.
O. P. NOBLE, Administrator.
BOILER.

No. 456,090. Patented July 14, 1891.

WITNESSES:
E. E. Hamill
B. L. Pierce

INVENTOR:
O. W. Noble
By C. B. Lutts
Att'y (No Model.) 4 Sheets—Sheet 2.

O. W. NOBLE, Dec'd.
O. P. NOBLE, Administrator
BOILER.

No. 456,090. Patented July 14, 1891.

WITNESSES:
E. E. Hamill
B. L. Pierce

INVENTOR:
O. W. Noble
By C. B. Tuttle
Atty (No Model.) 4 Sheets—Sheet 4.

O. W. NOBLE, Dec'd.
O. P. NOBLE, Administrator.
BOILER.

No. 456,090. Patented July 14, 1891.

WITNESSES
E. E. Harrell
B. L. Pierce

INVENTOR:
O. W. Noble
By C. B. Tuttle
Att'y

UNITED STATES PATENT OFFICE.

OSCAR W. NOBLE, OF LYNN, MASSACHUSETTS; OLIVER P. NOBLE ADMINISTRATOR OF SAID OSCAR W. NOBLE, DECEASED.

BOILER.

SPECIFICATION forming part of Letters Patent No. 456,090, dated July 14, 1891.

Application filed July 10, 1888. Renewed June 8, 1891. Serial No. 395,458. (No model.)

*To all whom it may concern:*

Be it known that I, OSCAR W. NOBLE, of Lynn, county of Essex, and Commonwealth of Massachusetts, have invented certain Improvements in Hot-Water Boilers, of which the following, taken in connection with the accompanying drawings, is a specification.

This invention relates to improvements in hot-water boilers used for the purpose of heating houses, and the nature thereof is hereinafter fully described and specifically claimed.

Figure 1:
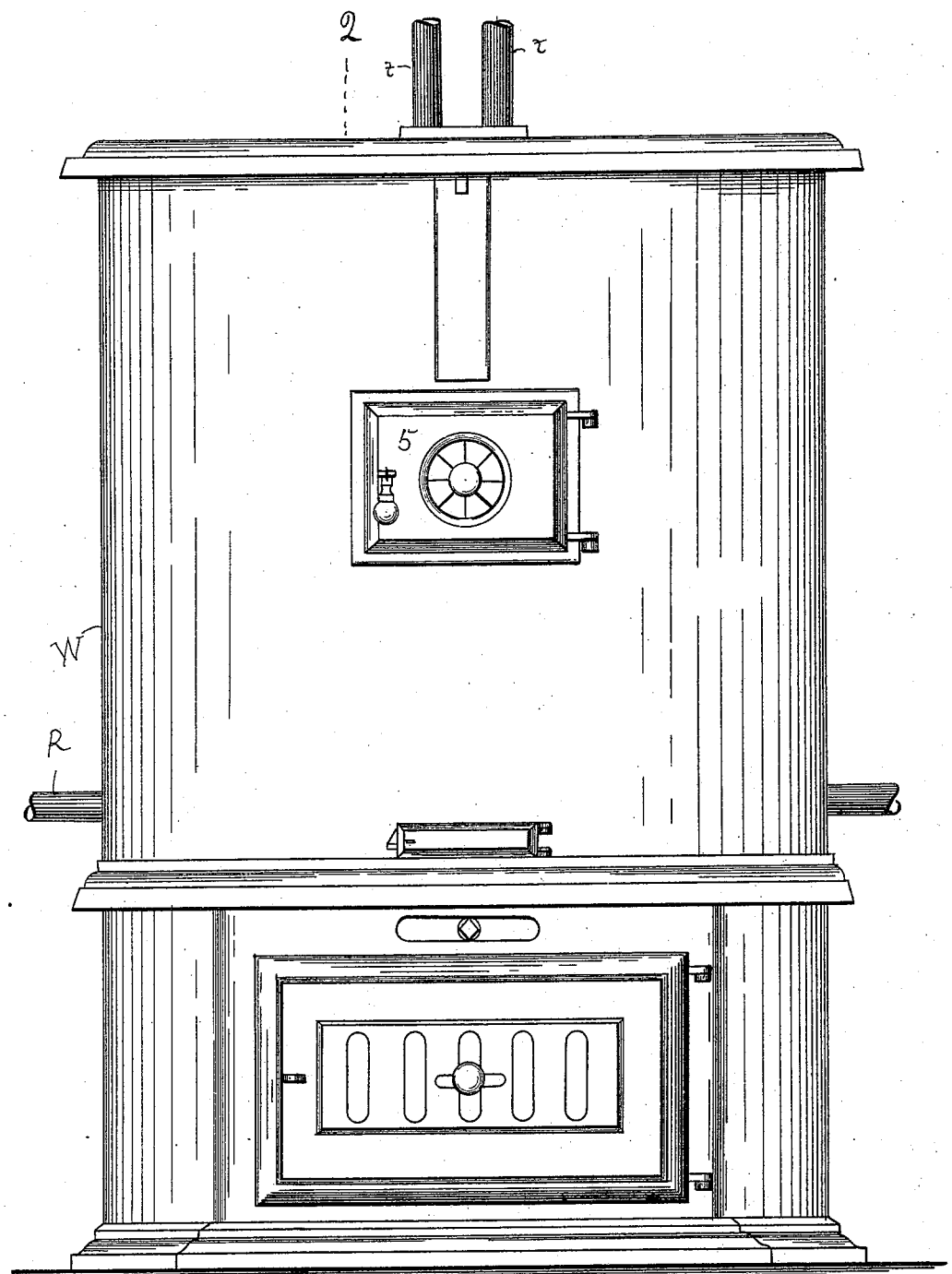
Figure 2:
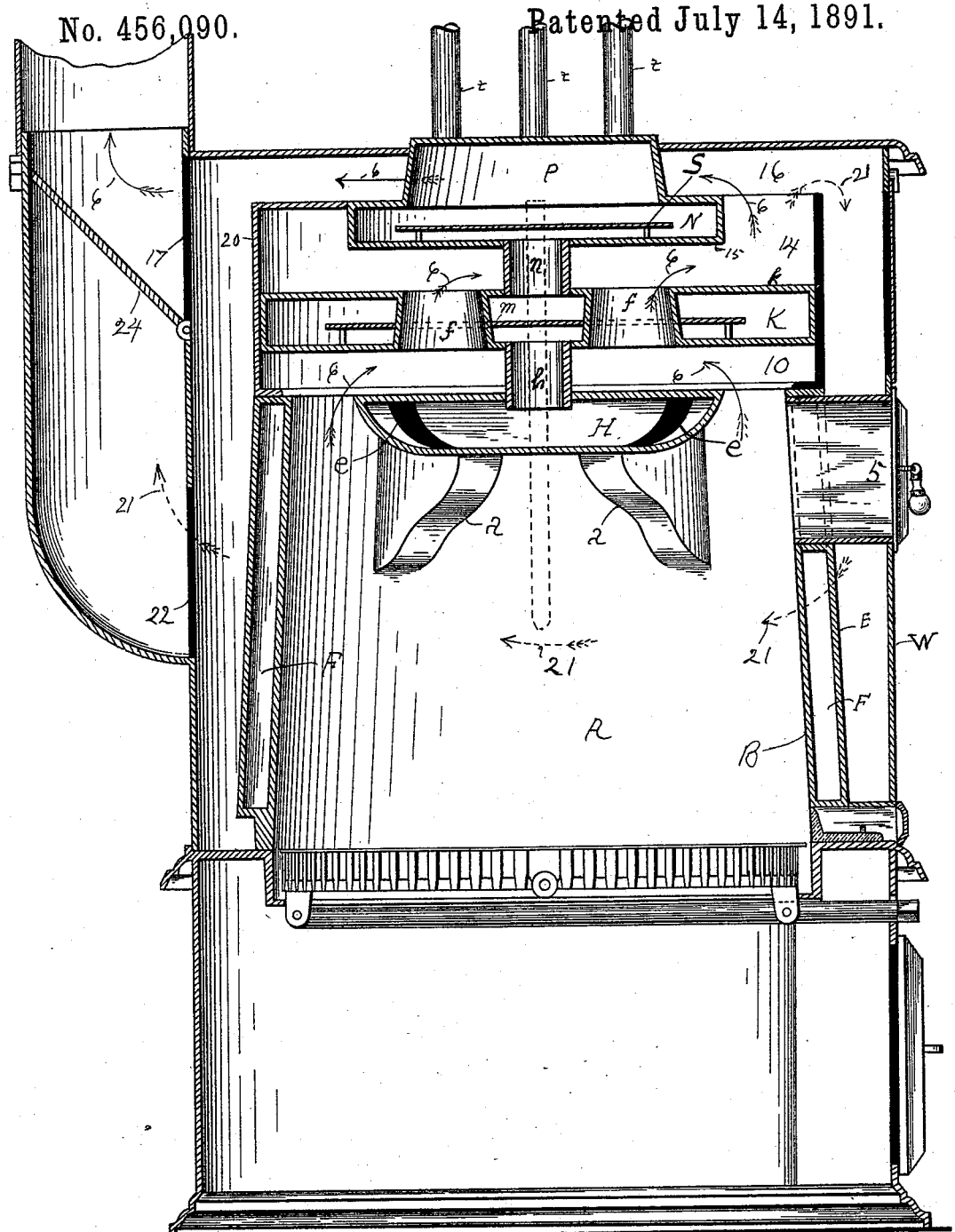
Figure 3:
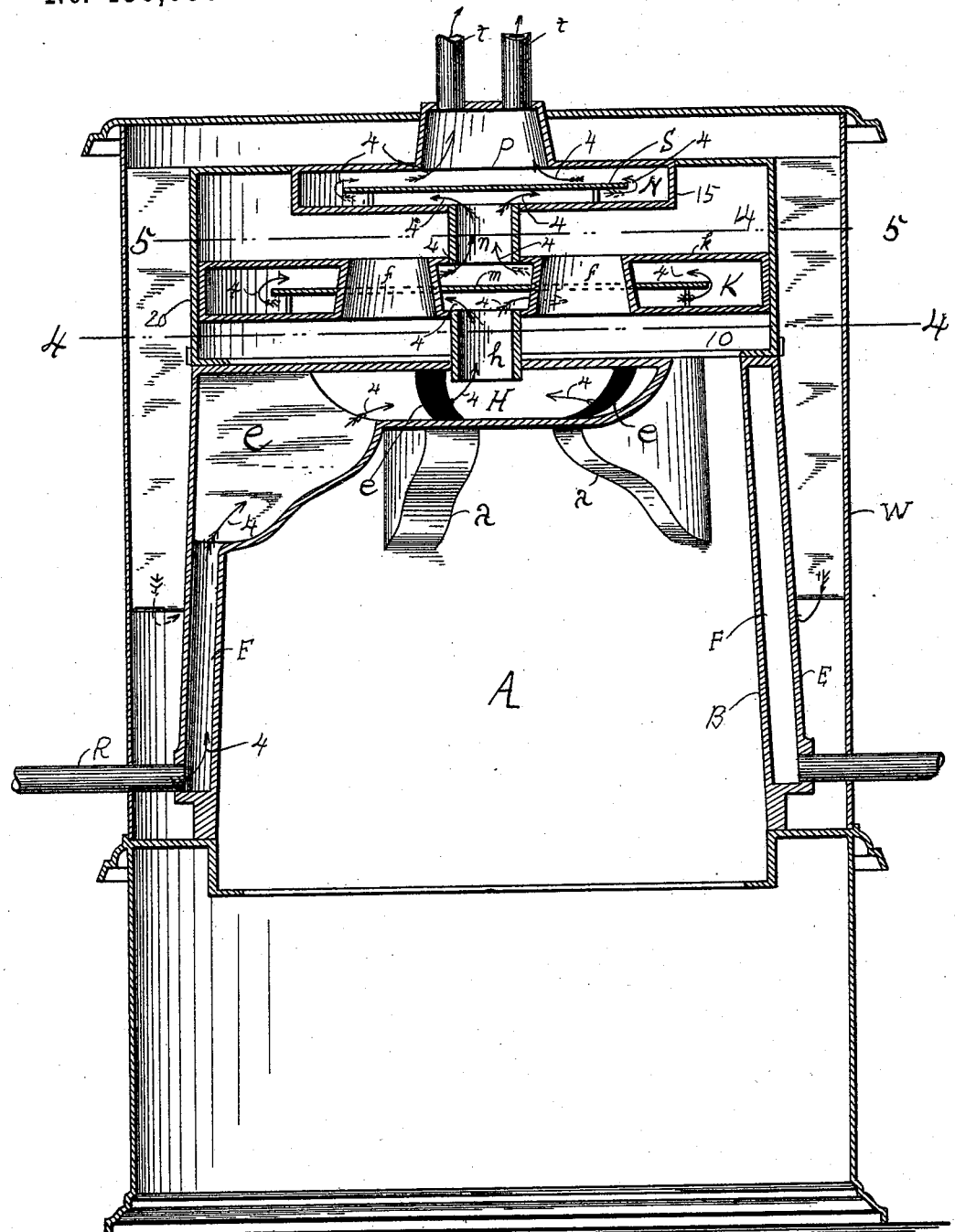
Figure 4:
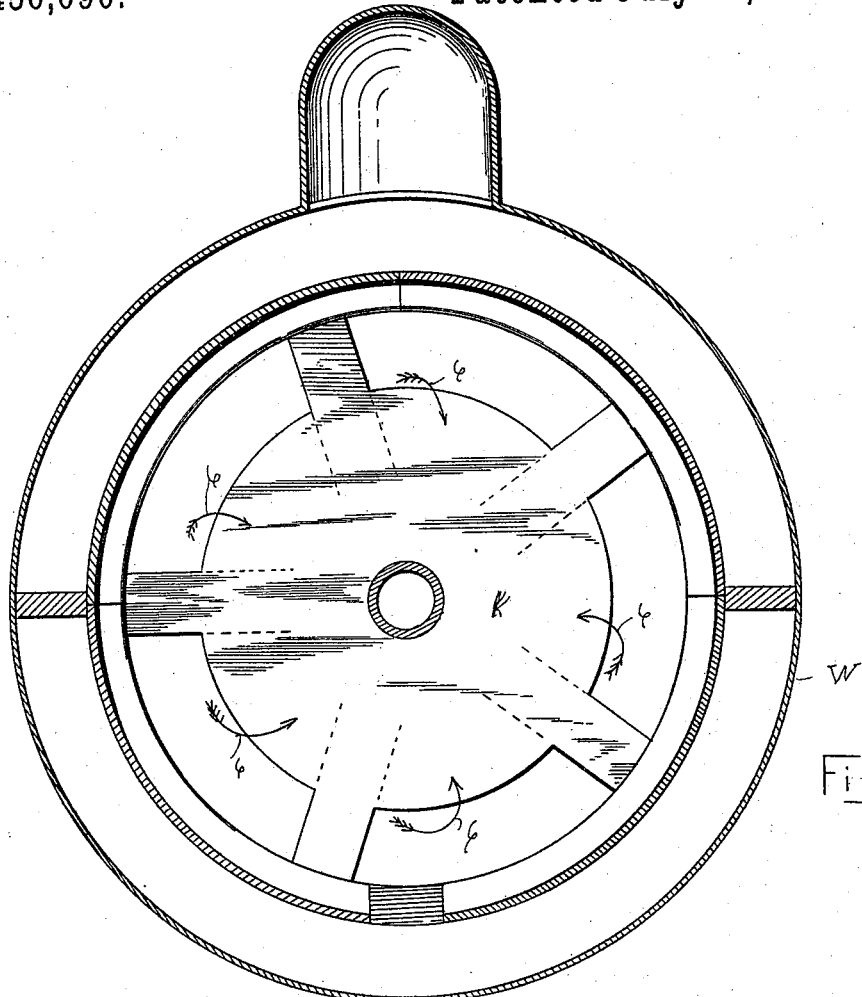
Figure 5:
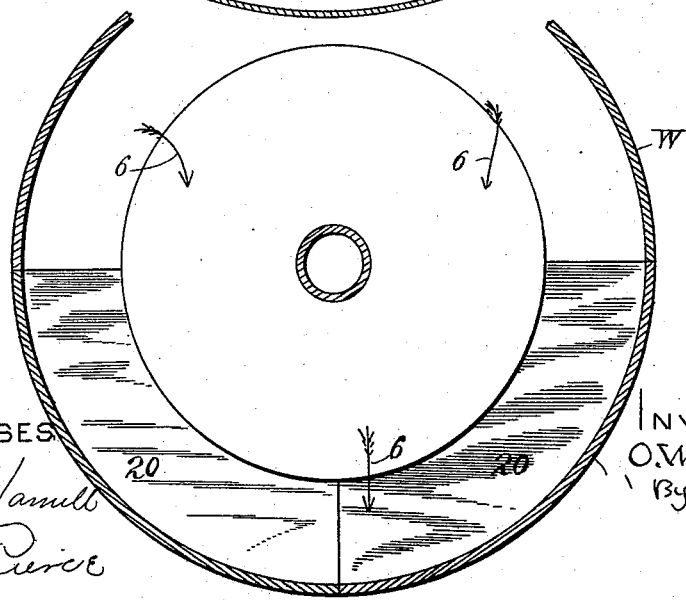

Referring to the drawings, Figure 1 is a front elevation of a hot-water boiler embodying this invention. Fig. 2 is an elevation of a longitudinal section on line 2 2. Fig. 3 is an elevation of a longitudinal section at right angles to the cutting plane of Fig. 2. Fig. 4 is a plan of section on line 4 4, looking down. Fig. 5 is a plan of a section on line 5 5, looking up.

The chamber represented in the drawings by letter A constitutes the fire-pot, to which end it is surrounded by a casing B. Said casing B is surrounded by an outer casing E, between which and the casing B is a chamber F for the reception of water. At the top of the chamber A the casing B has an irregular formation, whereby are formed the branches $a$. Said branches overhang the fire-pot, as represented in Figs. 2 and 3, and respectively inclose the chambers $e$, through which the water circulates from the chamber F to the chamber H, (see Figs. 2 and 3,) from which it passes upward through the opening or tube $h$ to a chamber K, formed in the jacket-casing $k$. Said chamber K contains a plate $m$, which is mounted upon supporting-pins to a height about midway of the chamber, and the water in passing up through the tube $h$ is first brought into contact with the bottom of the plate $m$, and is carried outward under the plate to the outer edges of the chamber, where space is made between the plate and jacket $k$ for the water to ascend above the plate, where it comes in contact with the casing $k$ and is forced inward to the central tube $n$. The jacket $k$ is provided with tubular openings $f$, through which the furnace heat ascends, as referred to hereinafter, and by which the water is superheated while circulating and ascending through the chamber K. The purpose of the plate $m$ is to retard the upward progress of the water and to obtain a better circulation and distribution thereof throughout the chamber K and consequently its heating-walls. From the tube $n$ the water passes upward into the chamber N, where it comes in contact with a plate S, which is arranged in the chamber N in a manner similar to the arrangement of the plate $m$ in chamber K, and by which the water is distributed and retained in the chamber N till it reaches the passage P, through which it ascends upward to the distributing-pipes $t$ $t$, whereby it is conducted off to the apartments to be heated, from which it is returned through suitable pipes (not shown) to enter the boiler through pipe R. At the entering point the water absorbs heat from the fire-pot through casing B, and is thereby lifted and carried upward to the exit-pipes $t$ $t$. During the upward passage the water is circulated through the various passages of the water-jacket, as indicated by the arrows 4 in Fig. 3 of the drawings.

The water-jacket is surrounded by an outer casing W. Through the casing W and also through the casings of the water-jacket is an opening 5, through which fuel is introduced to the fire-pot A. (See Fig. 2.) Said opening is closed by a suitable door, as represented. From the fire-pot A the heat and smoke pass upward in case of direct draft, as indicated in Fig. 2 of the drawings by the arrows 6, from which it will be observed that the heat passes from the fire-pot chamber A upward to the chamber 10, where it impinges against the bottom face of the casing $k$, by which it is directed along the chamber 10 to the tubular passages $f$, through which it ascends to the chamber 14. There it impinges against the bottom of casing 15 and is directed forward, where it lifts to the chamber 16 and passes rearward through the opening 17 to the smoke-pipe 18. The chambers 10 and 14 are closed at the rear by means of a casing 20, to the end that the heat shall be driven forward and find opening to the chamber 16 only in the forward part of the apparatus. The heat and smoke in case of indirect draft pass upward to the chamber 16, as before described. Thence they pass downward, as indicated by the arrows 21, Fig. 2, and find exit to the smoke-pipe through opening 22, to which end a damper 24 is provided, whereby to close the opening 17. The casings $k$ and 15 are preferably formed of cast-iron. The plates $m$ and S are cast metal, and in manufacture they are formed first and are combined with a suitable core material, from which the chambers K and N are fashioned in the usual manner of casting metals. The said casings $k$ and 15 are formed independently of each other and also independently of the water-jacket surrounding the fire-pot proper. They are afterward arranged one above the other and connected by short sections of pipe in which are the described passages $h\ n$, as shown in Fig. 2. The casing $k$ is provided with tubular openings $f$. I prefer to provide four of said passages. They are arranged relatively to the chambers H and N, substantially as shown in the drawings and hereinbefore described.

What I claim is—

1. The described water-heating apparatus, consisting of the fire-chamber, a water-jacket surrounding the chamber, an auxiliary chamber H in connection with the water-jacket, a chamber K, separated from the chamber H by a hot-air space, flues extending through said chamber K, a tube connecting the chambers H and K, an exit-tube $n$, and a deflecting-plate $m$, arranged in the chamber K between the tubes $h$ and $n$, substantially as described.

2. In combination with the fire-chamber, the water-jacket, the water-chamber H, the air-space 10, the water-chamber K, having flues $f\ f$, the air-space 14, having an opening at one side only, a water-chamber N, connected to chamber K by the tube $n$, the exit-pipes $t\ t$, and the deflecting-plate S in the chamber N between the tube $n$ and the exit-pipes $t\ t$, substantially as described.

Signed at Lynn, Massachusetts, this 3d day of July, A. D. 1888.

OSCAR W. NOBLE.

Witnesses:
JOHN H. HILLER,
C. B. TUTTLE.